United States Patent
Agiwal et al.

(10) Patent No.: US 10,306,599 B2
(45) Date of Patent: May 28, 2019

(54) METHOD AND DEVICE FOR ALLOCATING RESOURCES IN WIRELESS COMMUNICATION SYSTEM SUPPORTING D2D COMMUNICATION

(71) Applicant: Samsung Electronics Co., Ltd., Suwon-si, Gyeonggi-do (KR)

(72) Inventors: Anil Agiwal, Suwon-si (KR); June Hwang, Incheon (KR); Young-Bin Chang, Anyang-si (KR); Manali Sharma, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 15/504,506

(22) PCT Filed: May 12, 2016

(86) PCT No.: PCT/KR2016/005034
§ 371 (c)(1),
(2) Date: Feb. 16, 2017

(87) PCT Pub. No.: WO2016/182375
PCT Pub. Date: Nov. 17, 2016

(65) Prior Publication Data
US 2017/0230941 A1    Aug. 10, 2017

(30) Foreign Application Priority Data
May 12, 2015  (IN) .............................. 517/KOL/2015

(51) Int. Cl.
*H04W 40/22* (2009.01)
*H04W 72/04* (2009.01)
*H04W 88/04* (2009.01)

(52) U.S. Cl.
CPC ........... *H04W 72/04* (2013.01); *H04W 40/22* (2013.01); *H04W 72/048* (2013.01); *H04W 88/04* (2013.01)

(58) Field of Classification Search
CPC ..... H04W 68/00; H04W 76/02; H04W 88/02; H04W 88/06; H04W 92/02
See application file for complete search history.

(56) References Cited

U.S. PATENT DOCUMENTS 9,936,531 B2 *  4/2018  Wang .................... H04W 76/14
9,986,561 B2 *  5/2018  Seo ........................ H04W 72/02
(Continued)

FOREIGN PATENT DOCUMENTS

WO         2015-050403 A1    4/2015

OTHER PUBLICATIONS

Coolpad, Discussion on Architecture and Resource Allocation for ProSe UE-to-Network Relay, R2-151118, Apr. 20-24, 2015, Bratislava, Slovakia.
(Continued)

*Primary Examiner* — Sharad Rampuria
(74) *Attorney, Agent, or Firm* — Jefferson IP Law, LLP

(57) ABSTRACT

A resource allocation method and device capable of preventing resource conflict in a wireless communication system supporting device-to-device (D2D) communication is provided. The resource allocation method includes transmitting to a base station, by a relay user equipment (UE) located within a coverage of the base station, a message comprising indication information related to the relay UE, and performing, by the relay UE, D2D communication with a remote UE located out of the coverage by using a first resource, the first resource being allocated by the base station based on the indication information.

12 Claims, 9 Drawing Sheets

(56) References Cited

U.S. PATENT DOCUMENTS

2015/0045018 A1    2/2015  Liu et al.
2016/0234874 A1*   8/2016  Jung ..................... H04W 76/14
2016/0242144 A1*   8/2016  Adachi ................ H04W 76/14

OTHER PUBLICATIONS

ZTE, Considerations on the UE-to-Network Relays, R2-151169, Apr. 20-24, 2015, Bratislava, Slovakia.
Nokia Networks, Further clarifications to Sidelink UE Information procedure, R2-151582, Apr. 20-24, 2015, Bratislava, Slovakia.

* cited by examiner

METHOD AND DEVICE FOR ALLOCATING RESOURCES IN WIRELESS COMMUNICATION SYSTEM SUPPORTING D2D COMMUNICATION

CROSS-REFERENCE TO RELATED APPLICATION(S)

This application is a U.S. National Stage application under 35 U.S.C. § 371 of an International application filed on May 12, 2016 and assigned application number PCT/KR2016/005034, which claimed the benefit of an Indian patent application filed on May 12, 2015 in the Indian Intellectual Property Office and assigned Serial number 517/KOL/2015, the entire disclosure of each of which is hereby incorporated by reference.

TECHNICAL FIELD

The present disclosure relates to a method and an apparatus for communication in a wireless communication system. More particularly, the present disclosure relates to a method and an apparatus for allocating resources for communication in a wireless communication system supporting device-to-device (D2D) communication.

BACKGROUND

In order to meet wireless data traffic demands that have increased after 4th Generation (4G) communication system commercialization, efforts to develop an improved 5th generation (5G) communication system or a pre-5G communication system have been made. For this reason, the 5G communication system or the pre-5G communication system is called a beyond 4G network communication system or a post long-term evolution (LTE) system.

In order to achieve a high data transmission rate, an implementation of the 5G communication system in a mmWave band (for example, 60 GHz band) is being considered. In the 5G communication system, technologies such as beamforming, massive multiple-input and multiple-output (MIMO), full-dimensional MIMO (FD-MIMO), an array antenna, analog beam-forming, and a large-scale antenna are discussed to mitigate a propagation path loss in the mmWave band and increase a propagation transmission distance.

Further, technologies such as an evolved small cell, an advanced small cell, a cloud radio access network (cloud RAN), an ultra-dense network, device-to-device communication (D2D), a wireless backhaul, a moving network, cooperative communication, coordinated multi-points (CoMP), and interference cancellation have been developed to improve the system network in the 5G communication system.

In addition, the 5G system has developed advanced coding modulation (ACM) schemes such as hybrid frequency shift keying (FSK) and quadrature amplitude modulation (QAM) modulation (FQAM) and sliding window superposition coding (SWSC), and advanced access technologies such as filter bank multi carrier (FBMC), non-orthogonal multiple access (NOMA), and sparse code multiple access (SCMA).

D2D communication is being researched by communication standard groups to make a data communication service between user equipments (UEs) possible. During D2D communication, a transmission D2D UE may transmit data packets to a group of D2D UEs or broadcast data packets to all D2D UEs. D2D communication between a transmitter and receiver(s) essentially corresponds to a non-connection. That is, before the transmitter starts transmission of data packets, there is no connection configuration between the transmitter and the receiver. During transmission, the transmitter inserts a source identification (ID) and a destination ID into the data packets. The source ID is set as a UE ID of the transmitter. The destination ID corresponds to a broadcast ID or a group ID of the receiver to receive the transmitted packet.

One of the D2D communication requirements is to make an out-of-coverage remote UE communicate with a network through another UE (that is, a relay UE) that is within the network coverage and is close to the remote UE. The remote UE communicates with the relay UE through D2D communication. As described above, a resource allocation scheme for stable communication is required in a wireless communication system supporting D2D communication between the remote UE and the relay UE.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure addresses at least the above-mentioned problems and/or disadvantages and provides at least the advantages described below. Accordingly, an aspect of the present disclosure is to provide a method and an apparatus for allocation resources, which can prevent resource conflict in a wireless communication system supporting device-to-device (D2D) communication.

Another aspect of the present disclosure is to provide a method and an apparatus for allocating resources, which can prevent resource conflict in a wireless communication system supporting D2D communication between a remote UE and a relay UE.

In accordance with an aspect of the present disclosure, a method of allocating a resource in a wireless communication system supporting D2D communication is provided. The method includes transmitting to a base station, by a relay user equipment (UE) located within a coverage of the base station, a message comprising indication information related to the relay UE, and performing, by the relay UE, D2D communication with a remote UE located out of the coverage by using a first resource, the first resource being allocated by the base station based on the indication information.

In accordance with another aspect of the present disclosure, a relay UE in a wireless communication system supporting D2D communication is provided. The relay UE located within a coverage of a base station includes a communication interface configured to communicate with other network entity, and at least one processor configured to control to transmit, to the base station, a message comprising indication information related to the relay UE, and to perform D2D communication with a remote UE located out of the coverage by using a first resource, the first resource being allocated by the eNB based on the indication information.

In accordance with another aspect of the present disclosure, a method of allocating resources in a wireless communication system supporting D2D communication is provided. The method includes receiving, by a base station, a message comprising indication information related to a relay user equipment (UE) located within a coverage of the base station from the relay UE; and allocating, by the base station, a first resource for D2D communication with a remote UE located out of the coverage, the first resource being allocated to the relay UE based on the indication information.

In accordance with another aspect of the present disclosure, an base station in a wireless communication system supporting D2D communication is provided. The base station includes a communication interface configured to communicate with other network entity, and at least one processor configured to control to receive a message comprising indication information related to a relay user equipment (UE) located within a coverage of a base station from the relay UE, and to allocate a first resource for D2D communication with a remote UE located out of the coverage, the first resource being allocated to the relay UE based on the indication information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
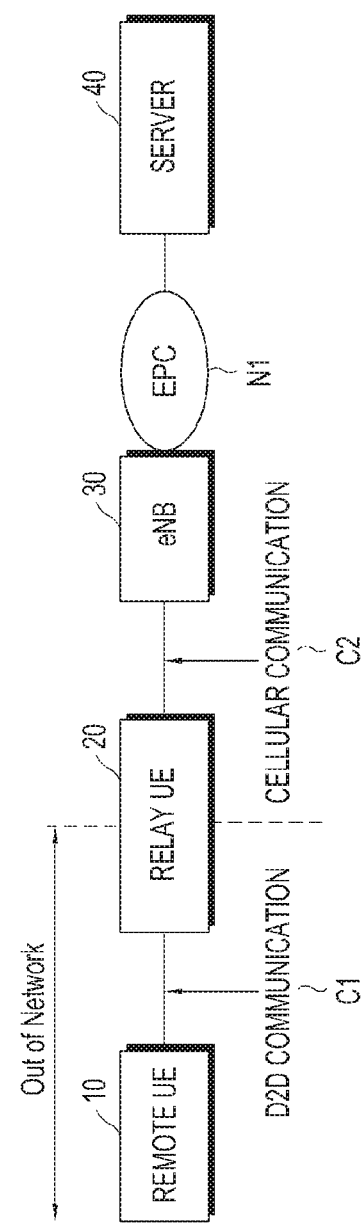
FIG. 1 illustrates an example of a configuration of a wireless communication system supporting device-to-device (D2D) communication between a remote user equipment (UE) and a relay UE according to an embodiment of the present disclosure.

FIG. 1 illustrates an example of a configuration of a wireless communication system supporting device-to-device (D2D) communication between a remote user equipment (UE) and a relay UE according to an embodiment of the present disclosure.

A system of FIG. 1 includes a remote UE 10, a relay UE 20, an evolved NodeB (eNB) 30, and a server 40. The server 40 may communicate with the eNB 30 through an evolved packet core (EPC) (N1). The EPC (N1) is a core network in a 3rd Generation Partnership Project (3GPP) long term evolution (LTE) network, and the server 40 may be a public safety server that provides a public safety service through relay communication in a situation such as disaster, fire, or the like. Further, it is assumed that the remote UE 10 illustrated in FIG. 1 escapes from the coverage of cellular communication (C2) through the eNB 30. In the specification, the UE performing D2D communication may be variously named such as a D2D UE, a D2D device, a terminal, or the like, and the eNB may be variously named such as a base station, an access point (AP), or the like. Further, the D2D communication may be also referred to as sidelink communication corresponding to UE to UE direct communication in the LTE standard.

Referring to FIG. 1, during an operation of the relay UE 20, the relay UE 20 may communicate with the remote UE 10 through D2D communication (C1) and also communicate with the eNB 30. In this case, the following conflicts may occur in network resources. For example, transmission (uplink) to the eNB 30 may collide with reception (D2D link) from the remote UE 10. The transmission (uplink) to the eNB 30 may collide with transmission (D2D link) to the remote UE 10. When the relay UE 20 does not have an additional reception (RX) chain for reception from the remote UE 10, reception (downlink) from the eNB 30 may collide with reception (D2D link) from the remote UE 10. Accordingly, for stable D2D relay communication in the communication system as illustrated in FIG. 1, it is important to allocate resources such that resources for D2D communication of the out-of-coverage remote UE 10 do not overlap with resources for scheduled transmission of the in-coverage relay UE 20.

Hereinafter, detailed embodiments of the present disclosure to prevent resource conflict in a wireless communication system supporting D2D communication between the remote UE 10 and the relay UE 20 will be described with reference to the accompanying drawings.

In a first embodiment of the present disclosure, the relay UE provides its own discontinuous reception (DRX) configuration to the remote UE. According to the first embodiment of the present disclosure, the DRX configuration may be provided at a connection setup time point. According to another embodiment of the present disclosure, the DRX configuration may be provided when the relay UE is (re-)constructed through the DRX configuration. The remote UE performs transmission to the relay UE only during DRX periods of the relay UE. This is because the relay UE does not perform any DL reception during the DRX since conflict between downlink (DL) reception of the relay UE and D2D link reception can be avoided when the relay UE does not have an additional receiver chain for the D2D link reception.

Also, this is because the relay UE does not perform any UL transmission during the DRX since the relay UE can avoid conflict between the D2D link reception and uplink (UL) transmission to the eNB.

In the first embodiment of the present disclosure, the relay UE may provide information on resources (scheduled or UE selected resources instructed through broadcast or dedicated signaling) allocated to the relay UE by the eNB for transmission to the remote UE through the D2D link. The remote UE performs transmission to the relay UE by using D2D resources in preset out-of-coverage (OOC) TX resources except for the resources instructed by the relay UE. This prevents conflict between remote UE transmission and relay UE transmission on the D2D link. Since both the relay UE transmission on the D2D and the relay UE transmission on the uplink are scheduled by the eNB, the conflict therebetween is avoided through proper scheduling by the eNB. When both the DRX configuration and the resource information are received from the relay UE, if the relay UE is in DRX through D2D resources in preset TX resources (for example, OOC resources) except for the resources instructed by the relay UE, the remote UE performs transmission.

Figure 2:
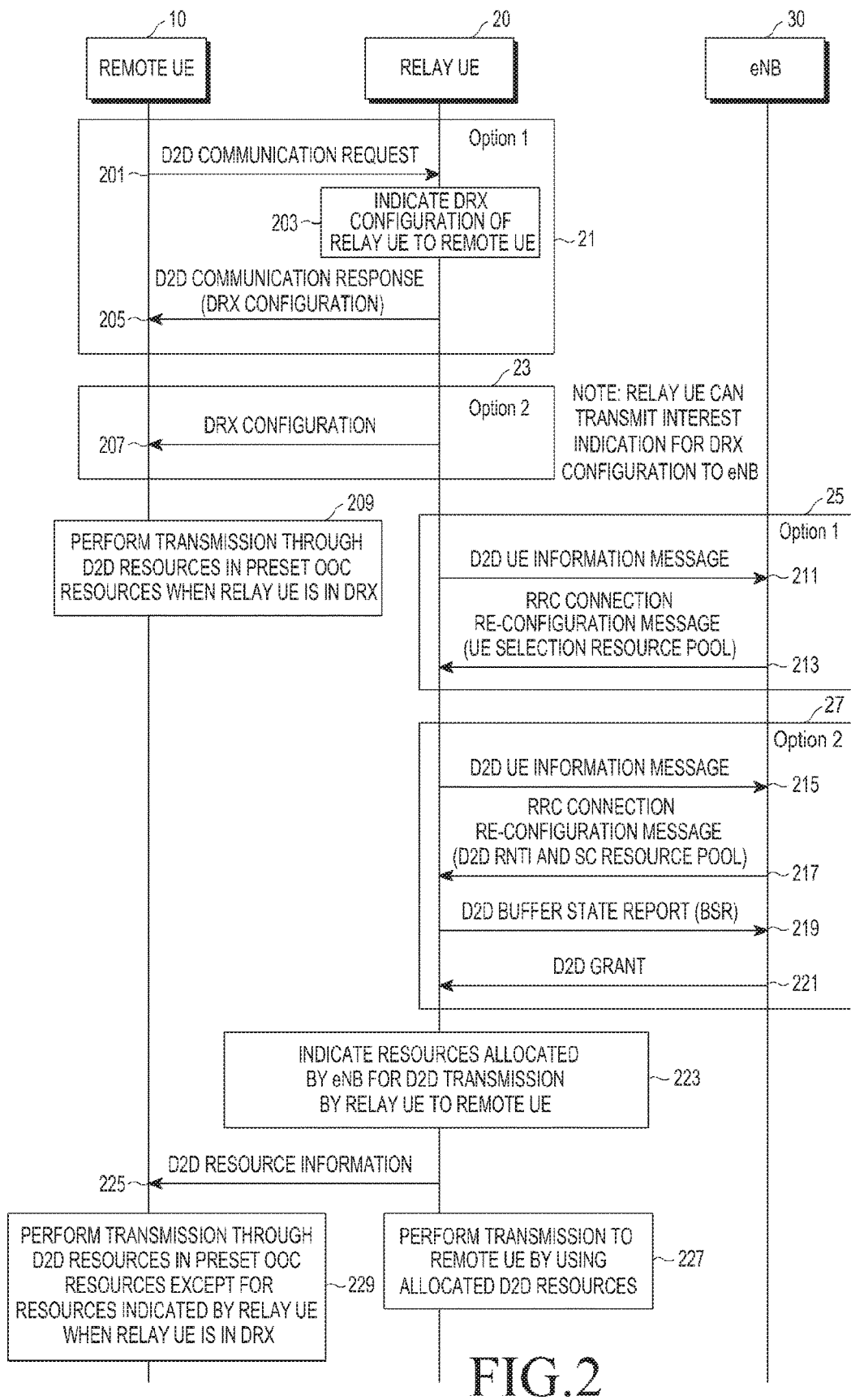
FIGS. 2 to 8 are diagrams for illustrating a resource allocation method in a wireless communication system supporting D2D communication between a remote UE and a relay UE according to various embodiments of the present disclosure.

FIG. 2 is a flowchart illustrating a resource allocation method in a wireless communication system supporting D2D communication between a remote UE and a relay UE according to the first embodiment of the present disclosure.

In the resource allocation method of FIG. 2, a DRX configuration may be provided to the remote UE 10 based on option #1 (Option 1) 21 or option #2 (Option 2) 23. In a description of the method based on option #1 21, the remote UE 10 makes a request for D2D communication to the relay UE 20 in operation 201, and the relay UE 20 instructs the remote UE 10 to perform the DRX configuration and transmits a D2D communication response including the DRX configuration to the remote UE 10 in operations 203 and 205. In a description of the method based on option #2 23, the relay UE 20 provides the DRX configuration to the remote UE 10 in operation 207. Thereafter, when the relay UE 20 is in DRX, the remote UE 10 performs transmission through D2D resources in preset OOC resources in operation 209.

In the resource allocation method of FIG. 2, resource allocation may be performed based on option #1 (Option 1) 25 or option #2 (Option 2) 27. In a description of the method based on option #1 25, the relay UE 20 transmits a D2D UE information message to the eNB 30 in operation 211, and the eNB 30 transmits an RRC connection reconfiguration message including a UE selection resource pool to the relay UE 20 in operation 213. In a description of the method based on option #2 27, the relay UE 20 transmits a D2D UE information message to the eNB 30 in operation 215, and the eNB 30 transmits an RRC connection reconfiguration message including a D2D radio network temporary identifier (RNTI) and a sidelink communication (SC) resource pool to the relay UE 20 in operation 217. Then, the relay UE 20 transmits a D2D buffer state report (BSR) to the eNB 30 in operation 219, and receives a D2D grant for resource allocation from the eNB 30 in operation 221.

Thereafter, in operations 223 and 225, the relay UE 20 instructs the remote UE 225 indicates resources allocated by the eNB 30 for D2D transmission by the relay UE 20 to the remote UE 225 and transmits the allocated D2D resource information to the remote UE 225. Thereafter, the relay UE 20 performs transmission to the remote UE 10 by using the allocated D2D resources in operation 227, and, when the relay UE 20 is in DRX, the remote UE 225 performs transmission through D2D resources in preset OOC resources except for the resources indicated by the relay UE 20 in operation 229.

A second embodiment of the present disclosure is the same as the method of the first embodiment of the present disclosure with the only exception being that a D2D gap configuration is known to the remote UE by the relay UE instead of the DRX configuration. The remote UE performs transmission to the relay UE only in D2D gap periods. The D2D gap periods corresponds to time in which the relay UE is scheduled by the eNB for UL transmission and/or DL reception.

Figure 3:
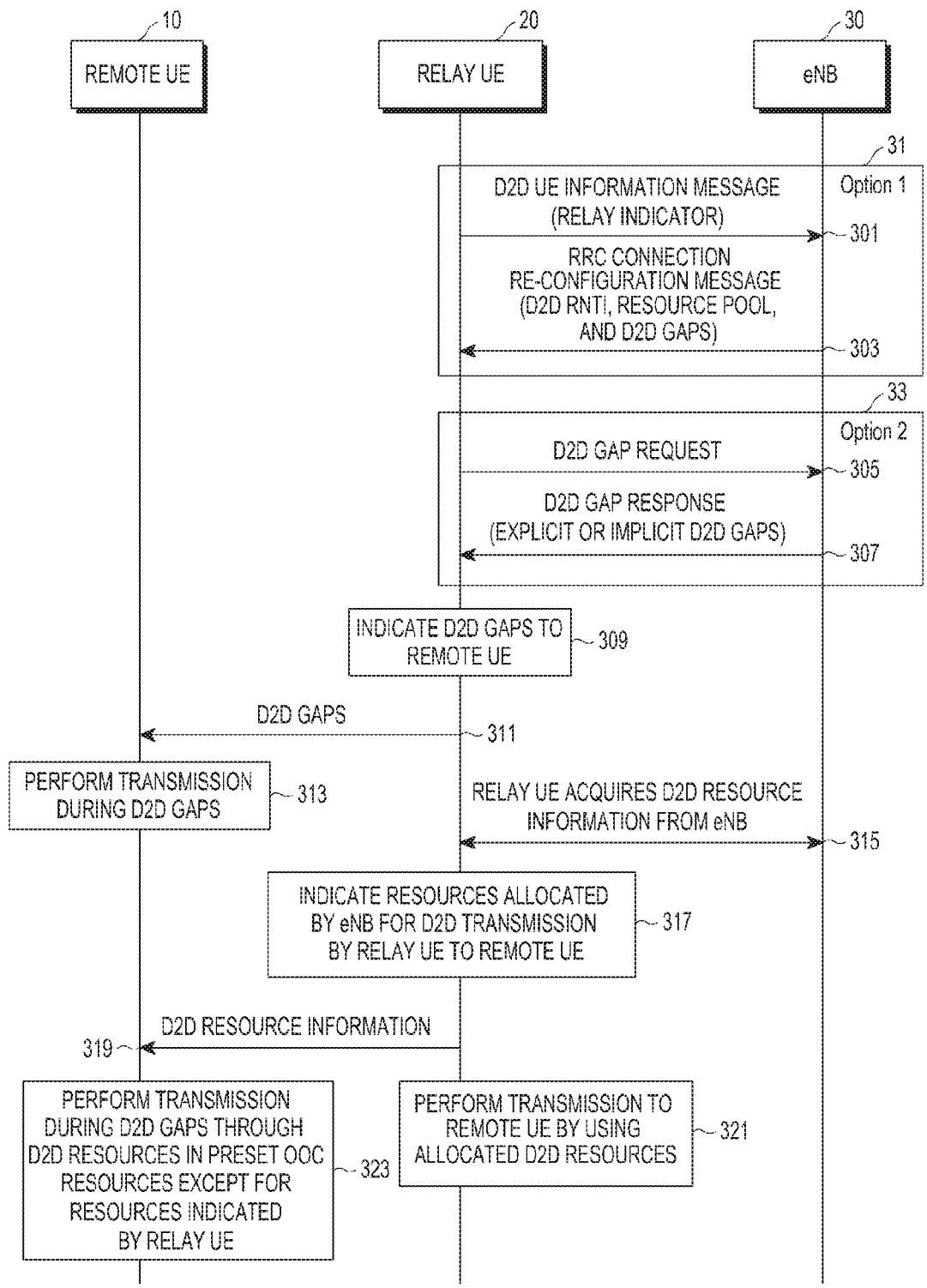

FIG. 3 is a flowchart illustrating a resource allocation method in a wireless communication system supporting D2D communication between a remote UE and a relay UE according to the second embodiment of the present disclosure.

In the resource allocation method of FIG. 3, D2D gap information may be provided to the relay UE 20 as shown in option #1 (Option 1) 31 or option #2 (Option 2) 33. In a method of the first option 31, the relay UE 20 transmits a D2D UE information message including a relay ID to the eNB 30 in operation 301, and the eNB 30 transmits an RRC connection reconfiguration message including a D2D RNTI, a resource pool, and D2D gaps to the relay UE 20 in operation 303. In a method of the second option 33, the relay UE 20 transmits a D2D gap request to the eNB 30 in operation 305, and the relay UE 20 receives a D2D gap response including explicit or implicit D2D gaps from the eNB 30 in operation 307. Thereafter, in operations 309 and 311, the relay UE 20 indicates D2D gaps to the remote UE 10 and transmits information on the D2D gaps. Then, in operation 313, the remote UE 10 performs transmission during the D2D gaps.

Meanwhile, in operation 315, the relay UE 20 acquires D2D resource information from the eNB 30. Since operations of operations 317 to 323 in which the remote UE 10 and the relay UE 20 communicate with each other by using resources that are allocated so as to not overlap are similar to operations 223 to 229 in FIG. 2, a detailed description thereof will be omitted. At this time, in operation 323 of FIG. 3, the remote UE 10 performs transmission during D2D gaps.

In a third embodiment of the present disclosure, the relay UE may provide information on resources (scheduled or UE-selected resources indicated through broadcast or dedicated signaling) allocated to the relay UE by the eNB for transmission to the remote UE through the D2D link. The remote UE performs transmission to the relay UE by using D2D resources in preset TX resources except for the resources indicated by the relay UE. This prevents conflict between remote UE transmission and relay UE transmission on the D2D link. Since both the relay UE transmission on the D2D and the relay UE transmission on the uplink are scheduled by the eNB, the conflict therebetween is avoided through proper scheduling by the eNB.

In the third embodiment of the present disclosure, the DRX configuration is not known to the UE. The conflict between downlink (DL) and D2D line reception of the relay UE is avoided through the use of an additional receiver chain by the relay UE for the D2D link reception.

In the third embodiment of the present disclosure, when the relay UE makes a request for resources for uplink transmission, resources for uplink are allocated by the eNB to not conflict with resources used for transmission by the remote UE. The eNB does not schedule the uplink by preset OOC TX resources. The eNB may receive (or acquire)

information on the preset OOC TX resources by a proximity service (ProSe) function or the relay UE. Unlike this, the eNB may already have the information as a part of the network configuration. This prevents conflict between D2D link reception of the relay UE and uplink (UL) transmission to the eNB. The eNB may perform such an operation for every UE that makes a request for uplink transmission. The eNB may perform such an operation for every D2D UE that makes a request for uplink transmission. The eNB may perform such an operation for every D2D UE that makes a request for uplink transmission and is interested in D2D link reception. As still another plan, the eNB may perform the operation for a D2D UE for which the relay operation is allowed. Unlike this, the eNB may perform the operation for a D2D UE for which the relay operation is allowed and that indicates the relay operation to the eNB (that is, relay indication to the eNB through a signaling message).

Figure 4:
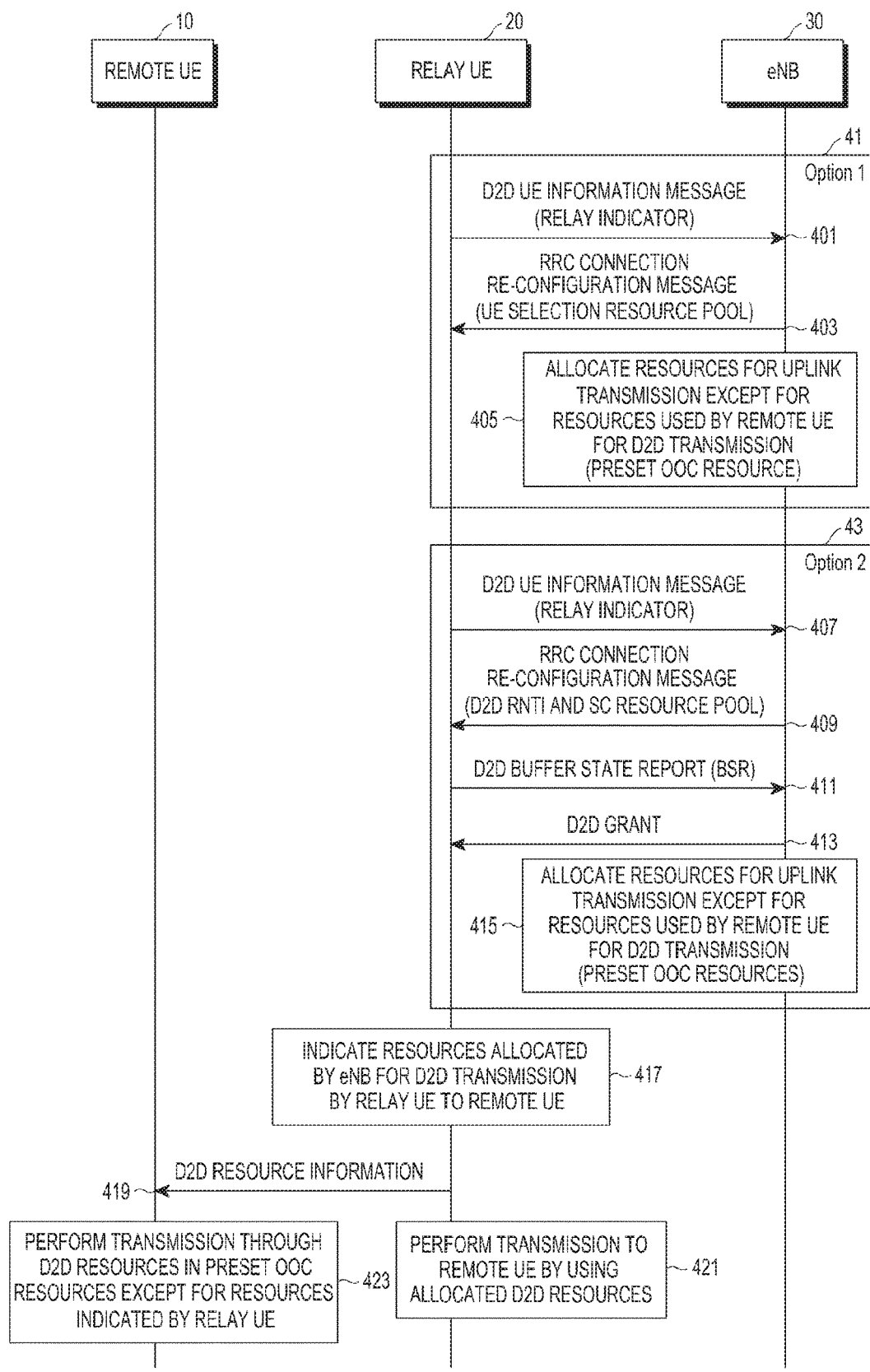

FIG. 4 is a flowchart illustrating a resource allocation method in a wireless communication system supporting D2D communication between a remote UE and a relay UE according to the third embodiment of the present disclosure.

The resource allocation method of FIG. 4 may be performed based on option #1 (Option 1) 41 or option #2 (Option 2) 43.

First, in a description of the method based on operation #1 41, the relay UE 20 transmits a D2D UE information message including relay indication message (that is, a relay indicator) related to the relay UE 20 to the eNB 30 in operation 401. The eNB 30 transmits an RRC connection re-configuration message to the relay UE 20 in operation 403, and the RRC connection re-configuration message may include a UE selection resource pool. Further, the eNB 30 allocates resources for uplink transmission of the relay UE 20 except for resources (preset OOC resources) used by the remote UE 10 for D2D transmission in operation 405.

In a description of the method based on option #2 43, the relay UE 20 transmits a D2D UE information message including relay indication information (that is, a relay indicator) related to the relay UE 20 to the eNB 30 in operation 407. Then, the eNB 30 transmits an RRC connection re-configuration message to the relay UE 20 in operation 409, and the RRC connection re-configuration message may include a D2D RNTI and an SC resource pool. Further, the relay UE 20 transmits a D2D buffer state report (BSR) to the eNB 30 in operation 411, and the eNB 30 transmits a D2D grant to the relay UE 20 in operation 413. Thereafter, the eNB 30 allocates resources for uplink transmission of the relay UE 20 except for resources (preset OOC resources) used by the remote UE 10 for D2D transmission in operation 415.

Since operations of operation 417 to 423 in which the remote UE 10 and the relay UE 20 communicate with each other by using resources that are allocated so as to not overlap are similar to the operations of operations 223 to 229 in FIG. 2, a detailed description thereof will be omitted.

In a fourth embodiment of the present disclosure, the relay UE provides its own DRX configuration to the remote UE. According to an embodiment of the present disclosure, the DRX configuration may be provided at a connection configuration time point. According to another embodiment of the present disclosure, the DRX configuration may be provided when the relay UE is (re-)constructed through the DRX configuration. The remote UE performs transmission to the relay UE only during DRX periods of the relay UE. This is because the relay UE does not perform any DL reception during the DRX since the relay UE can avoid conflict between downlink (DL) reception and D2D link reception when the relay UE does not have an additional receiver chain for the D2D link reception. Also, this is because the relay UE does not perform any UL transmission during the DRX since the relay UE can avoid conflict between the D2D link reception and uplink (UL) transmission to the eNB.

In the fourth embodiment of the present disclosure, the eNB provides the resources to the relay UE such that resources (scheduled or UE-selected) for transmission on the D2D link do not overlap with preset OOC TX resources used by the remote UE. This prevents conflict between remote UE transmission and relay UE transmission on the D2D link. Since both the relay UE transmission on the D2D and the relay UE transmission on the uplink are scheduled by the eNB, the conflict therebetween is avoided through proper scheduling by the eNB. The eNB may receive (or acquire) information on the preset OOC TX resources by a ProSe function, the relay UE, or a D2D UE. Unlike this, the eNB may already have the information as a part of the network configuration. The eNB may perform the operation for every UE that makes a request for resources for D2D link transmission. As another plan, the eNB may perform the operation for every D2D UE that makes a request for D2D link transmission. As still another plan, the eNB may perform the operation for a D2D UE for which the relay operation is allowed. Unlike this, the eNB may perform the operation for a D2D UE for which the relay operation is allowed and that indicates the relay operation to the eNB (that is, relay indication to the eNB through a signaling message).

Figure 5:
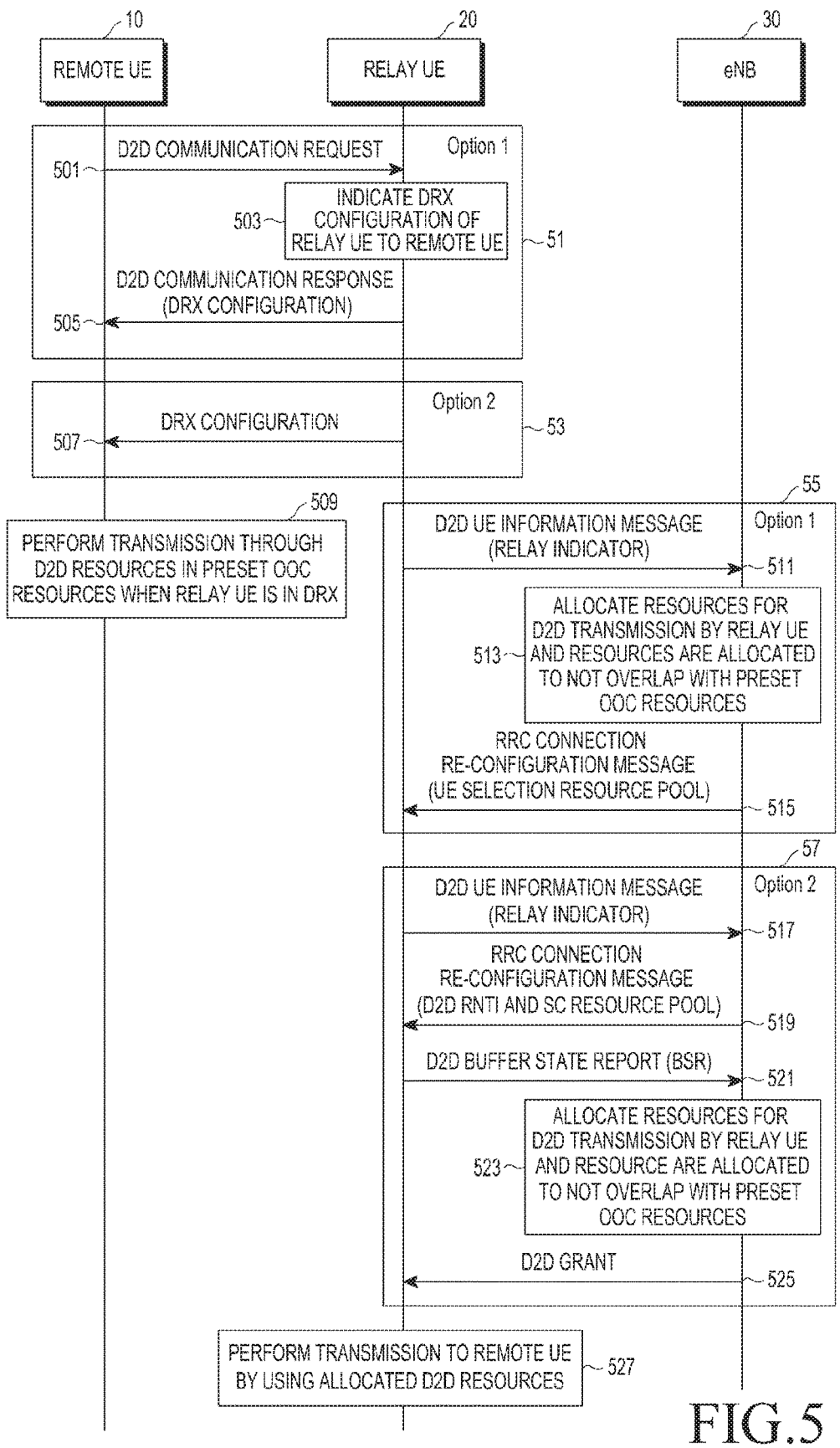

FIG. 5 is a flowchart illustrating a resource allocation method in a wireless communication system supporting D2D communication between a remote UE and a relay UE according to the fourth embodiment of the present disclosure.

Referring to FIG. 5, DRX configuration may be provided to the remote UE 10 based on option #1 (Option 1) 51 or option #2 (Option 2) 53. Further, operations of operations 501 to 509 in FIG. 5 are the same, respectively, as the operations of operations 201 to 209 in FIG. 2 (as described above) and thus, a description thereof will be omitted herein.

The resource allocation method of FIG. 5 may be performed based on option #1 (Option 1) 55 or option #2 (Option 2) 57.

In a description of the method based on option #1 55, the relay UE 20 transmits a D2D UE information message including relay indication information (that is, a relay indicator) related to the relay UE 20 to the eNB 30 in operation 511. The eNB 30 allocates resources for D2D transmission by the relay UE 20 in operation 513, and the allocated resources do not overlap with OOC resources preset by the remote UE 10. The eNB 30 transmits an RRC connection re-configuration message to the relay UE 20 in operation 515, and the RRC connection re-configuration message may include a UE selection resource pool.

In a description of the method based on option #2 57, the relay UE 20 transmits a D2D UE information message including relay indication information (that is, a relay indicator) related to the relay UE 20 to the eNB 30 in operation 517. Then, the eNB 30 transmits an RRC connection re-configuration message to the relay UE 20 in operation 519, and the RRC connection re-configuration message may include a D2D RNTI and an SC resource pool. The relay UE 20 transmits a D2D buffer state report (BSR) to the eNB 30 in operation 521, and the eNB 30 allocates resources for D2D transmission by the relay UE 20 in operation 523 and the allocated resources do not overlap with the preset OOC resources. In operation 525, the eNB 30 transmits a D2D grant to the relay UE 20.

Thereafter, in operation 527, the relay UE 20 may perform transmission to the remote UE 10 by using the D2D resources that are allocated so as to not overlap.

A fifth embodiment of the present disclosure is similar to the fourth embodiment of the present disclosure except that D2D gap configuration is informed to the remote UE by the relay UE instead of the DRX configuration. The remote UE performs transmission to the relay UE only during D2D gap periods. The D2D gaps correspond to a time during which the relay UE is scheduled by the eNB for UL transmission and/or DL reception.

Figure 6:
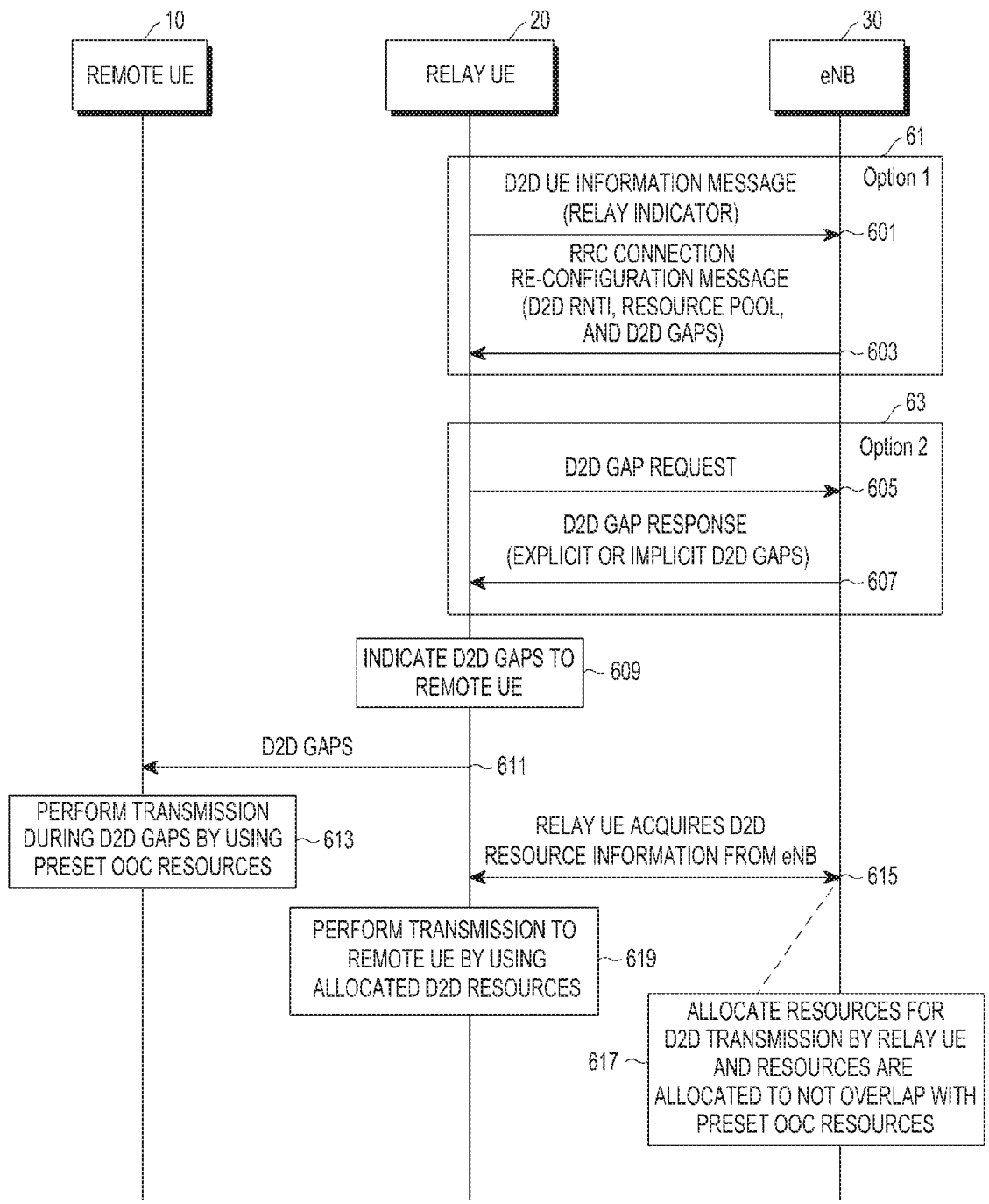

FIG. 6 is a flowchart illustrating a resource allocation method in a wireless communication system supporting D2D communication between a remote UE and a relay UE according to the fifth embodiment of the present disclosure.

In the resource allocation method of FIG. 6, D2D gap information may be provided to the relay UE 20 based on option #1 (Option 1) 61 or option #2 (Option 2) 63. Further, operations of operations 601 to 611 in which D2D gap information is provided to the remote UE 10 are the same, respectively, as operations 301 to 311 in FIG. 3, as described above, and thus a description thereof will be omitted herein. Thereafter, in operation 613, the remote UE 10 performs transmission during D2D gaps by using preset OOC resources. Meanwhile, the relay UE 20 acquires D2D resource information from the eNB 30 in operation 615, and the eNB 30 allocates resources for D2D transmission by the relay UE 20 in operation 617 and the resources are allocated to not overlap with the preset OOC resources. Further, in operation 619, the relay UE 20 performs transmission to the remote UE by using the allocated D2D UEs.

First, Table 1 below shows mechanism of controlling resource conflict according to each case for which conflict needs to be avoided based on a sixth embodiment of the present disclosure. In Table 1 below, PC5 corresponds an interface used for D2D communication between UEs in the LTE standard, and Uu corresponds to an interface used for communication between the UE and the eNB.

TABLE 1

| Cases for which conflict need to be avoided | Conflict Handling |
| --- | --- |
| PC5-TX$_{RelayUE}$ & PC5-TX$_{RemoteUE}$ | Non overlapped in coverage and OOC(Out Of Coverage) D2D resources |
| PC5-TX$_{RemoteUE}$ & Uu-TX$_{RelayUE}$ OR PC5-RX$_{RelayUE}$ & Uu-TX$_{RelayUE}$ | eNB schedules Uu TX in resources other than those included in pre-configured OOC resource |
| PC5-TX$_{RelayUE}$ & Uu-TX$_{RelayUE}$ | eNB schedules PC5 and Uu TX at different times |
| PC5-RX$_{RelayUE}$ & Uu-RX$_{Relay\ UE}$ | Relay UE uses separate RX chain |

In Table 1 above, PC5-TX$_{RelayUE}$ denotes D2D link transmission of the relay UE, PC5-TX$_{RemoteUE}$ denotes D2D link transmission of the remote UE, PC5-RX$_{RelayUE}$ denotes D2D link reception of the relay UE, Uu-TX$_{RelayUE}$ denote uplink transmission of the relay UE, and Uu-RX$_{Relay\ UE}$ denotes downlink reception of the relay UE.

In the sixth embodiment of the present disclosure, the remote UE performs transmission to the relay UE by using preset out of coverage (OOC) transmission (TX) resources. The network sets preset OOC transmission resources such that the preset OCC transmission resources used by the OOC UE (remote UE) do not overlap with transmission resources (signaled by the eNB) used by the in-coverage UE (relay UE). The conflict between downlink (DL) and D2D line reception of the relay UE may be avoided through the use of an additional receiver chain by the relay UE for the D2D link reception.

In the sixth embodiment of the present disclosure, the relay UE transmits, to the eNB, a D2D UE information message indicating that resources for relay communication (one-to-one or one-to-many communication) with one or a plurality of remote UE(s) are required. In this embodiment of the present disclosure, when the relay UE makes a request for resources for uplink transmission, resources for uplink are allocated by the eNB to not conflict with resources used by the remote UE for transmission. The eNB does not schedule the uplink by preset OOC TX resources. The eNB may receive (or acquire) information on the preset OOC TX resources by a ProSe function, the relay UE, or a D2D UE. Unlike this, the eNB may already have the information on the preset OOC TX resources as a part of the network configuration. This prevents conflict between D2D link reception of the relay UE and uplink (UL) transmission to the eNB. The eNB may perform such an operation for every UE that makes a request for uplink transmission. As another plan, the eNB may perform the operation for every D2D UE that makes a request for uplink transmission. Unlike this, the eNB may perform the operation for every D2D UE that makes a request for uplink transmission and is interested in D2D link reception. As still another plan, the eNB may perform the operation for a D2D UE for which the relay operation is allowed. Unlike this, the eNB may perform the operation of a D2D UE for which the relay operation is allowed and that transmits D2D UE information and transmits a D2D UE information message indicating the relay operation to the eNB (that is, relay indication to the eNB through a signaling message) or informing the eNB that resources for relay one-to-on communication with one or a plurality of remote UE(s) are required.

The relay UE transmits D2D UE information indicates to the eNB that resources for relaying one-to-one communication with one or a plurality of remote UE(s) are required. A destination ID of the relay UE may be also included in the D2D UE information message. In the sixth embodiment of the present disclosure, the eNB provides the resources to the relay UE such that resources (scheduled or UE-selected) for transmission on the D2D link do not overlap with pre-configured OOC TX resources used by the remote UE. This prevents collision between remote UE transmission and relay UE transmission on the D2D link. Since both the relay UE transmission on the D2D and the relay UE transmission on the uplink are scheduled by the eNB, the collision therebetween is avoided through proper scheduling by the eNB. The eNB may receive (or acquire) information on the preset OOC TX resources by a ProSe function, the relay UE, or a D2D UE. Unlike this, the eNB may already have the information as a part of the network configuration. The eNB may perform the operation for every UE that makes a request for resources for D2D link transmission. As another plan, the eNB may perform the operation for every UE that makes a request for D2D link transmission. As still another plan, the eNB may perform the operation for a D2D UE for which the relay operation is allowed. Unlike this, the eNB may perform the operation for a D2D UE for which the relay operation is allowed and that indicates the relay operation to the eNB (that is, relay indication to the eNB through a signaling message).

Figure 7:
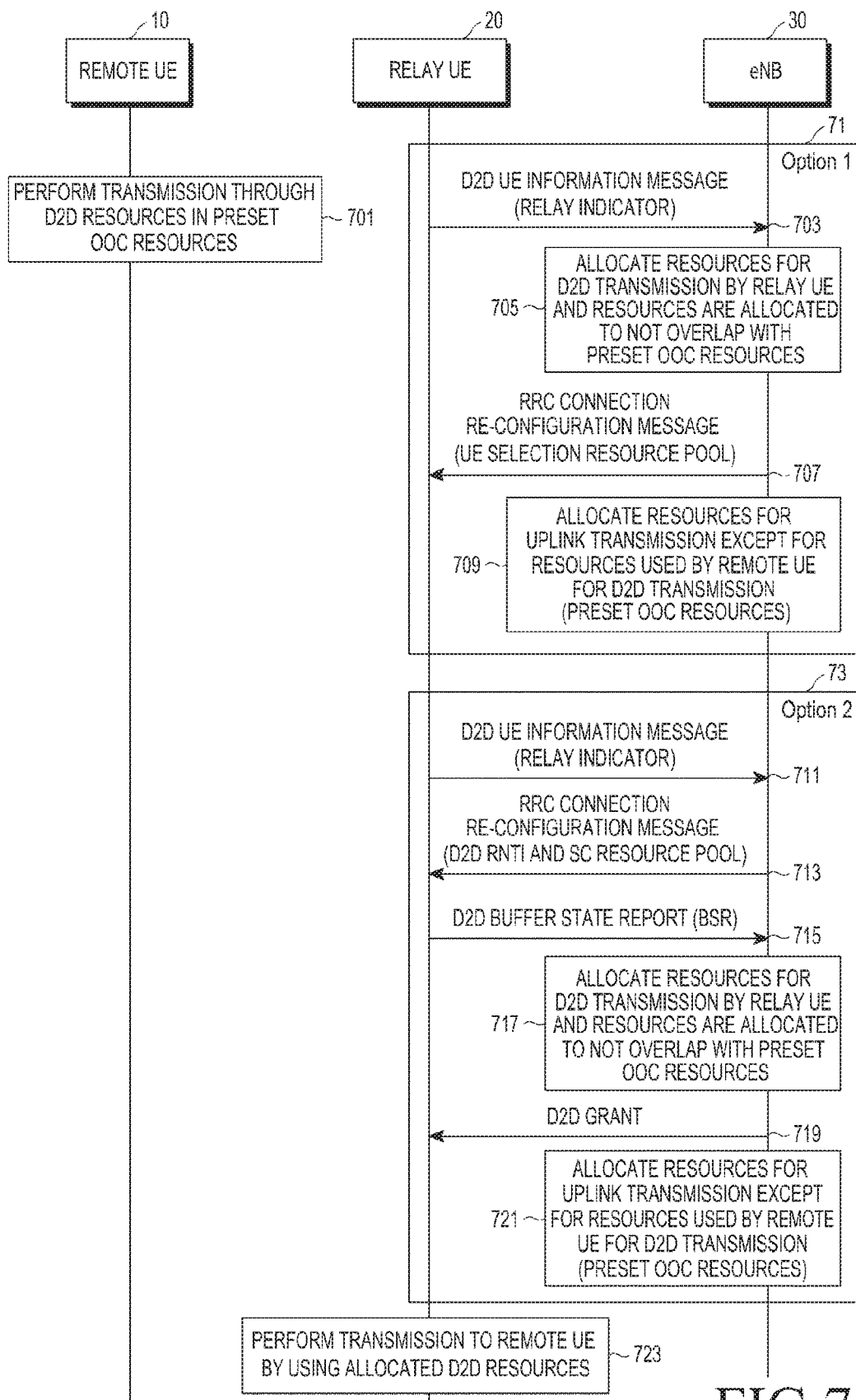

FIG. 7 is a flowchart illustrating a resource allocation method in a wireless communication system supporting D2D communication between a remote UE and a relay UE according to the sixth embodiment of the present disclosure.

The sixth embodiment of the present disclosure proposes a method of allocating resources such that resources for D2D communication of the OOC remote UE 10 do not overlap with resources for scheduled transmission of the in-coverage relay UE 20.

Referring to FIG. 7, in operation 701, the remote UE 10 performs transmission through D2D resources in preset OOC resources (that is, the OOC resources). The resource allocation method of FIG. 7 may be performed based on option #1 (Option 1) 71 or option #2 (Option 2) 73.

First, in a description of the method based on operation #1 71, the relay UE 20 transmits a D2D UE information message including relay indication message (that is, a relay indicator) related to the relay UE 20 to the eNB 30 in operation 703. The eNB 30 allocates resources for D2D transmission by the relay UE 20 in operation 705, and the allocated resources do not overlap with OOC resources preset by the remote UE 10. The eNB 30 transmits an RRC connection re-configuration message to the relay UE 20 in operation 707, and the RRC connection re-configuration message may include a UE selection resource pool. Further, the eNB 30 allocates resources for UL transmission of the relay UE 20 except for resources (preset OOC resources) used by the remote UE 10 for D2D transmission in operation 709.

In a description of the method based on option #2 73, the relay UE 20 transmits a D2D UE information message including relay indication information (that is, a relay indicator) related to the relay UE 20 to the eNB 30 in operation 711. Then, the eNB 30 transmits an RRC connection re-configuration message to the relay UE 20 in operation 713, and the RRC connection re-configuration message may include a D2D radio network temporary identifier (RNTI) and a sidelink communication (SC) resource pool. The relay UE 20 transmits a D2D buffer state report (BSR) to the eNB 30 in operation 715, and the eNB 30 allocates resources for D2D transmission by the relay UE 20 in operation 717 and the allocated resources do not overlap with the preset OOC resources. Thereafter, the eNB 30 transmits a D2D grant to the relay UE 20 in operation 719, and allocates resources for uplink transmission of the relay UE 20 except for resources (preset OOC resources) used by the remote UE 10 for D2D transmission in operation 721. Then, in operation 723, the relay UE 20 may perform transmission to the remote UE 10 by using the D2D resources that are allocated so as to not overlap.

In a seventh embodiment of the present disclosure, the relay UE makes a request for resources to the eNB for the relay operation. According to an embodiment of the present disclosure, the eNB provides two resource pools. One is used by the relay UE for transmission to the remote UE and the other is used by the relay UE for reception from the remote UE. According to an embodiment of the present disclosure, the relay UE informs the remote UE of a resource pool used by the relay UE for reception from the remote UE. The resource pool is used by the remote UE for transmission. According to another embodiment of the present disclosure, the relay UE informs the remote UE of a resource pool used for reception by the relay UE from the remote UE and also informs the remote UE of a resource pool used for transmission by the relay UE.

Uplink transmission is scheduled to the relay UE by the eNB to not overlap with the resource pools informed to the UE for the relay operation.

In an eighth embodiment of the present disclosure, the relay UE makes a request for resources to the eNB for the relay operation. The eNB provides a resource pool for the relay operation. The remote UE makes a request for resources to the relay UE. According to an embodiment of the present disclosure, the relay UE allocates resources from the resource pool, which has been allocated by the eNB, to the remote UE. According to another embodiment of the present disclosure, the relay UE indicates, to the remote UE, time periods in which the allocated resource pool can be used.

In a ninth embodiment of the present disclosure, it is assumed that D2D link operates the remote UE, the relay UE communicates through frequency F1, and the relay UE and the eNB communicate through frequency F2.

According to an embodiment of the present disclosure, the relay UE informs the remote UE of whether the relay UE is within the coverage of the D2D link frequency or not. When the relay UE can detect a call through a frequency (for example, when DL reference signal received power (RSRP) meets a reference S in the LTE standard), the relay UE is within the coverage of corresponding frequency. The indication may be transmitted during a connection configuration between the relay UE and the remote UE. Unlike this, it may be indicated through a discovery message notified by the relay UE. As another plan, it may be transmitted through a predetermined signaling message. When the relay UE is within the coverage of the D2D link frequency, the remote UE uses resources preset for transmission. Otherwise, the remote UE makes a request for resources to the relay UE. The relay UE allocates transmission resources or informs of time periods in which the allocated resource pool can be used. The remote UE performs reception through preset RX resources. The relay UE allocates resources from the preset TX resources.

According to another embodiment of the present disclosure, the remote UE always makes a request for resources to the relay UE. When the relay UE is not within the coverage of the D2D link frequency, the relay UE allocates transmission resources. The remote UE performs reception through preset RX resources. When the relay UE is within the coverage of the D2D link frequency, the relay UE does not allocate transmission resources and informs the remote UE of the fact. Then, the remote UE uses the preset TX resources for transmission. The remote UE performs reception through preset RX resources.

According to another embodiment of the present disclosure, when the relay UE is not within the coverage of the D2D link frequency, the relay UE does not inform that the relay UE itself is the relay. As a result, the remote UE does not search for the network relay UE.

According to another embodiment of the present disclosure, whether the relay UE is within the coverage of the D2D link frequency is indicated through a discovery message. The remote UE may use the indication as one parameter used when the relay is selected. For example, the UE may select a relay within the coverage of the D2D link frequency rather than another relay that is not within the coverage of the D2D link frequency.

According to an embodiment of the present disclosure, in the aforementioned methods, the preset OOC resources used by the remote UE may be resources set for relay communication. This may prevent competition between non-relay communication (group communication and unicast communication through PC5) and relay communication.

Figure 8:
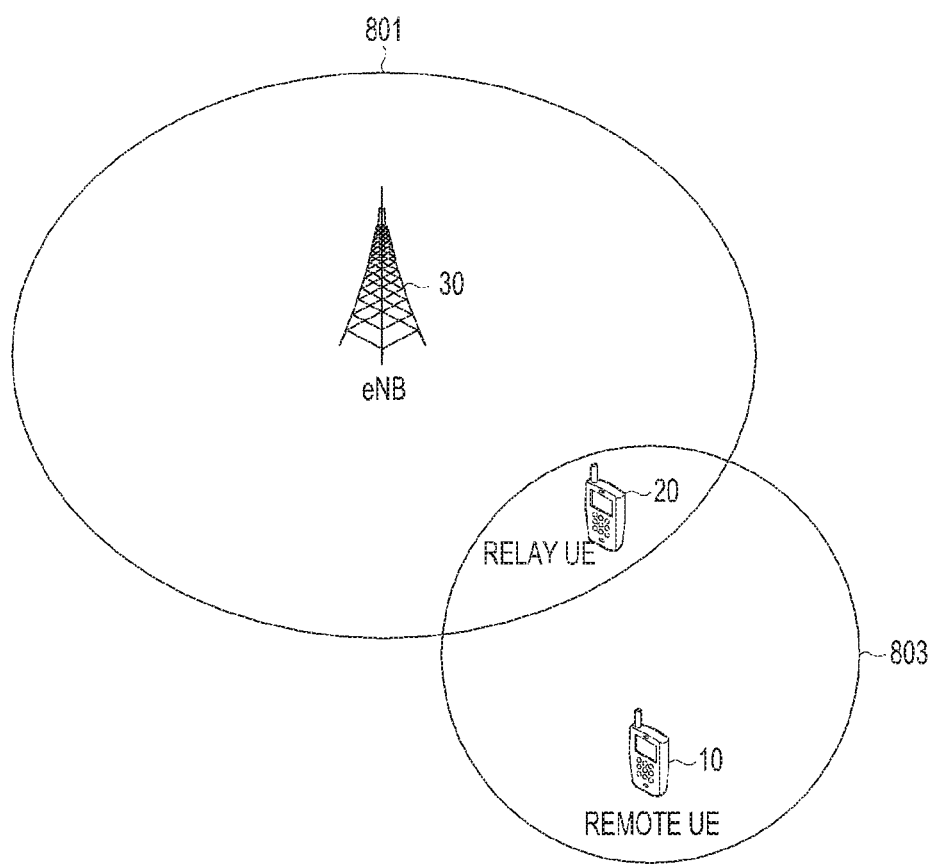

A tenth embodiment of the present disclosure proposes two preset resource pools below for D2D: the first resource pool is one resource pool for PC5 unicast and/or group communication; and the second resource pool is a secondary pool specified for the UE relay to the network. Referring to FIG. 8, the remote UE 10 transmits data to the relay UE 20 from the remote UE 10 to the network by using resources preset for the UE relay to the network in an area 803, and the relay UE 20 uses resources allocated by the eNB 30 for transmission in an area 801. According to an embodiment of the present disclosure, the resources allocated by the eNB are from the PC5 resource pool. According to another embodiment of the present disclosure, the eNB allocates the resources, but makes the resources not conflict with resources used by the remote UE.

In the tenth embodiment of the present disclosure, when the relay UE makes a request for resources for uplink transmission, resources for uplink are allocated by the eNB to not conflict with resources used by the remote UE for transmission. The eNB does not schedule the uplink by preset OOC TX and RX resources.

The eNB may receive (or acquire) information on the preset OOC TX and RX resources by a ProSe function, the relay UE, or a D2D UE. Unlike this, the eNB may already have the information as a part of the network configuration. This prevents conflict between D2D relay link reception of the relay UE and uplink (UL) transmission to the eNB. The eNB may perform such an operation for every UE that makes a request for uplink transmission. The eNB may perform the operation for every D2D UE that makes a request for uplink transmission. Unlike this, the eNB may perform the operation for every D2D UE that makes a request for uplink transmission and is interested in D2D relay link reception. As still another plan, the eNB may perform the operation for a D2D UE for which the relay operation is allowed. Unlike this, the eNB may perform the operation for a D2D UE for which the relay operation is allowed and that indicates the relay operation to the eNB (that is, relay indication to the eNB through a signaling message).

An eleventh embodiment of the present disclosure proposes the use of a D2D PC5 resource pool by the remote UE for data transmission to the relay UE acting as a relay from the UE to the network. However, in order to avoid competition with group or private communication using the PC5 resource pool, the eleventh embodiment of the present disclosure proposes a priority of the remote UE to access the relay service from the UE to the network be higher than UEs performing off network communication. The priority is provided by higher layers. The relay UE acting as the relay from the UE to the network transmits data to the remote UE by using resources allocated by the eNB. The eNB allocates the resources, but makes the resources not conflict with resources used by the remote UE for transmission.

In the eleventh embodiment of the present disclosure, when the relay UE makes a request for resources for uplink transmission, resources for uplink are allocated by the eNB to not conflict with resources used by the remote UE for transmission. The eNB does not schedule the uplink by preset OOC TX resources.

The eNB may receive (or acquire) information on the preset OOC TX resources by a ProSe function, the relay UE, or a D2D UE. Unlike this, the eNB may already have the information as a part of the network configuration. This prevents conflict between D2D link reception of the relay UE and uplink (UL) transmission to the eNB. The eNB may perform such an operation for every UE that makes a request for uplink transmission. As another plan, the eNB may perform the operation for every D2D UE that makes a request for uplink transmission. Unlike this, the eNB may perform the operation for every D2D UE that makes a request for uplink transmission and is interested in D2D relay link reception. As still another plan, the eNB may perform the operation for a D2D UE for which the relay operation is allowed. Unlike this, the eNB may perform the operation for a D2D UE for which the relay operation is allowed and that indicates the relay operation to the eNB (that is, relay indication to the eNB through a signaling message).

Figure 9:
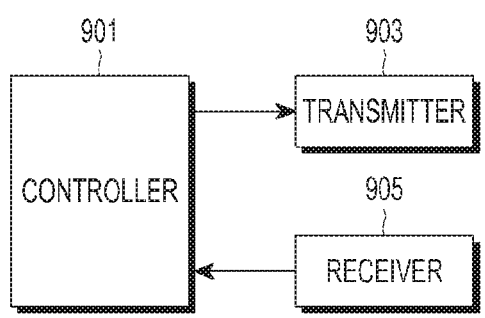
FIG. 9 illustrates a device configuration according to an embodiment of the present disclosure.

FIG. 9 illustrates a device configuration and the device of FIG. 9 may be applied to the remote UE, the relay UE, and the eNB according to an embodiment of the present disclosure.

The device configuration of FIG. 9 includes a controller 901 (e.g., at least one processor), a transmitter 903, and a receiver 905, and the controller 901 makes a control to allocate resources such that resources for D2D communication of the OOC remote UE 10 do not overlap with resources for scheduled transmission of the in-coverage relay UE 20 for stable D2D relay communication according to the resource allocation method described in FIGS. 1 to 8 and to perform communication using the allocated resources. The transmitter 903 and receiver 905 can be combined as a transceiver (not shown). Further, the transmitter 903 and the receiver 905 may be for data communication with another network entity and may be implemented as at least one communication interface.

In one configuration example, the UE 20 may include a communication interface configured to communicate with another network entity and a controller that makes a control to transmit a message including indication information related to the relay UE 20 to the eNB and to perform D2D communication with the remote UE by using resources allocated based on the indication information from the eNB 30.

In one configuration example, the eNB 30 may include a communication interface configured to communicate with another network entity and a controller that makes a control to receive a message including indication information related to the relay UE 20 from the relay UE 20 and to allocate resources for D2D communication with the OOC remote UE 10 to the relay UE 20.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of allocating a resource in a wireless communication system supporting device-to-device (D2D) communication, the method comprising:

transmitting to a base station, by a relay user equipment (UE) located within a coverage of the base station, a message comprising indication information for D2D communication; and performing, by the relay UE, the D2D communication with a remote UE located out of the coverage by using a first resource, the first resource is allocated to the relay UE based on the indication information, wherein the indication information indicates the first resource, wherein the first resource and a preconfigured second resource are used for D2D communication between the relay UE and the remote UE, the preconfigured second resource is allocated to the remote UE, and wherein the first resource is not overlapped with the preconfigured second resource.

2. The method of claim 1, wherein the message comprises a D2D UE information message.

3. The method of claim 1, wherein the indication information indicates that the relay UE requires the first resource for relay communication with the remote UE.

4. The method of claim 1, wherein the relay UE performs relay communication with one or more remote UEs.

5. A relay UE in a wireless communication system supporting (D2D) communication, the relay user equipment (UE) being located within a coverage of a base station eNB, the relay UE comprising:
 a communication interface configured to communicate with another network entity; and
 at least one processor configured to control:
  to transmit, to the base station, a message comprising indication information for D2D communication, and
  to perform the D2D communication with a remote UE located out of the coverage by using a first resource, the first resource allocated to the relay UE based on the indication information,
 wherein the indication information indicates the first resource,
 wherein the first resource and a preconfigured second resource are used for D2D communication between the relay UE and the remote UE, the preconfigured second resource is allocated to the remote UE, and
 wherein the first resource is not overlapped with the preconfigured second resource.

6. The relay UE of claim 5, wherein the message comprises a D2D UE information message.

7. The relay UE of claim 5, wherein the indication information indicates that the relay UE requires the first resource for relay communication with the remote UE.

8. The relay UE of claim 5, wherein the relay UE performs relay communication with one or more remote UEs.

9. A method of allocating a resource in a wireless communication system supporting device-to-device (D2D) communication, the method comprising:
 receiving, by a base station, a message comprising indication information for D2D communication from a relay UE located within a coverage of the base station; and
 allocating, by the base station, a first resource for the D2D communication with a remote UE located out of the coverage, the first resource allocated to the relay UE based on the indication information,
 wherein the indication information indicates the first resource,
 wherein the first resource and a preconfigured second resource are used for D2D communication between the relay UE and the remote UE, the preconfigured second resource is allocated to the remote UE, and
 wherein the first resource is not overlapped with the preconfigured second resource.

10. The method of claim 9, wherein the indication information indicates that the relay UE requires the first resource for relay communication with the remote UE.

11. A base station in a wireless communication system supporting device-to-device (D2D) communication, the base station comprising:
 a communication interface configured to communicate with another network entity; and
 at least one processor configured to control:
  to receive a message comprising indication information for D2D communication from a relay UE located within a coverage of the base station, and
  to allocate a first resource for the D2D communication with a remote UE located out of the coverage, the first resource allocated to the relay UE based on the indication information,
 wherein the indication information indicates the first resource,
 wherein the first resource and a preconfigured second resource are used for D2D communication between the relay UE and the remote UE, the preconfigured second resource is allocated to the remote UE, and
 wherein the first resource is not overlapped with the preconfigured second resource.

12. The base station of claim 11, wherein the indication information indicates relay communication with the remote UE using the D2D communication.

* * * * *